April 21, 1942.  J. C. FINELY  2,280,225
KITCHEN UTENSIL
Filed April 12, 1940
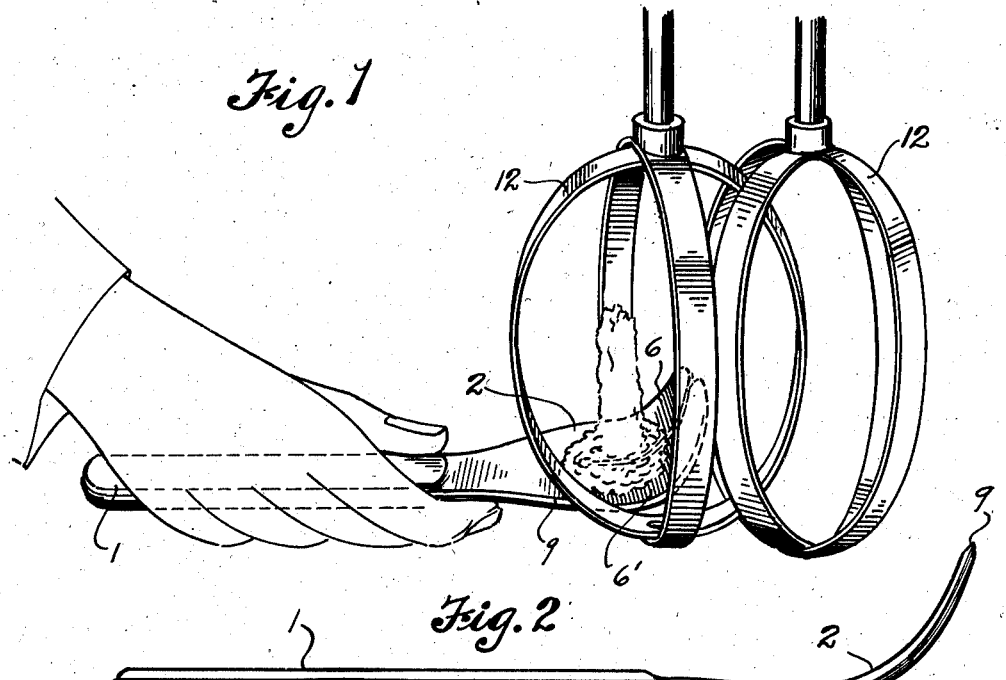
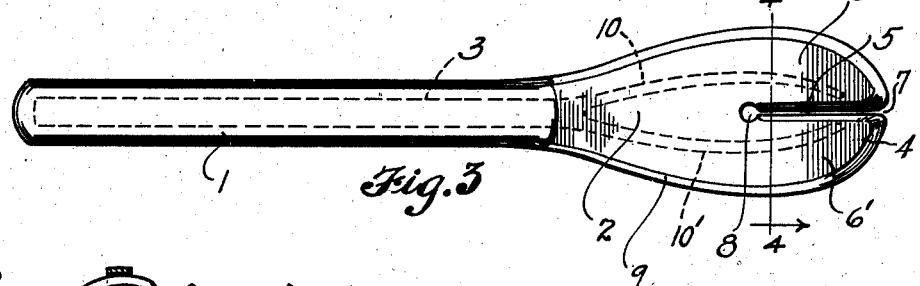
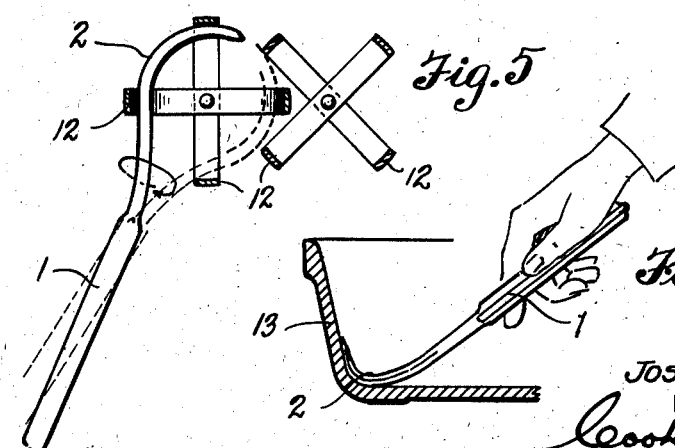
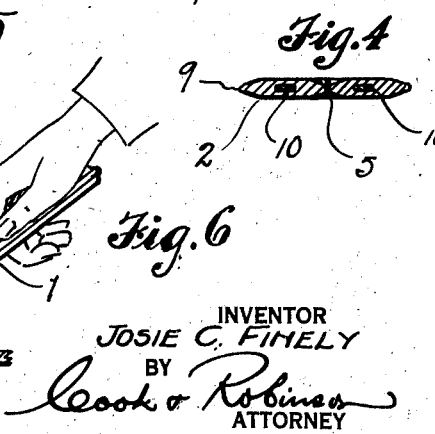
INVENTOR
JOSIE C. FINELY
BY
Cook & Robinson
ATTORNEY Patented Apr. 21, 1942

2,280,225

UNITED STATES PATENT OFFICE 2,280,225

KITCHEN UTENSIL

Josie C. Finely, Seattle, Wash.

Application April 12, 1940, Serial No. 329,297

3 Claims. (Cl. 15—245)

This invention relates to kitchen utensils and has reference more particularly to improvements in devices that are especially designed for cleaning and scraping material from the beating members of the ordinary types of beaters, particularly those beaters which have revolubly mounted and coacting wire loops, or strip metal loops and adapted to be manually or electrically operated for the beating of eggs, batter and the like. It is not the intention, however, that the present invention be restricted, or confined in its use to the cleaning of any particular type of egg, or batter beater, or only to the cleaning of beaters, although that use, at present, probably is the principal use to which the device will be put.

It will here be stated, in explanation to the present invention, that it has always been a difficult matter to satisfactorily clean or remove whipped or beaten material such as batter or eggs from the beating loops of the ordinary type of beater, or to get the greater part of the material that may cling to the whipping or beater loops, out from within these loops. Especially is it difficult to remove waffle or cake batter, or any other material of a quick-drying kind from within the overlapping and intermeshing loops of the present-day types of beaters. Due to this difficulty of cleaning, there is usually an unnecessary loss of material which might well be used, and no doubt would be used if it could be more easily or more readily scraped from within or scooped from the beater elements.

In view of the above mentioned difficulties, it has been the principal object of this invention to provide a utensil that is especially useful for the cleaning of beaters as used in kitchens for the beating of batter, eggs, cream and the like, and whereby the wire or metal strip loops of the beater may be scraped clean, or stripped of any material that may cling thereto and whereby that material that may be contained within the loops after a beating operation may be easily scooped out.

It is also an object of this invention to provide a beater cleaning utensil of the above kind that is sufficiently flexible to readily adapt itself to beaters of various sizes and shapes, and which also may be used to advantage for the cleaning or scraping of dishes, pans and other types of kitchen equipment.

A still further object of the present invention is to provide a utensil adapted to the above stated uses that is relatively inexpensive, practically indestructible and capable of being kept in a clean and sanitary condition without unusual attention.

Specifically stated, the present invention resides in the provision of a beater cleaning device having a handle portion terminating in a spoon, or scoop-like portion made of a flexible material, such as rubber, and wherein the scoop end portion is slit, or bifurcated for the reception within the slit of the wire or strap metal loop of a beater so that by drawing the spoon shaped end portion of the device along the strap or wire loop, all batter or material clinging to the latter will be scraped off and retained within the scoop for easy removal. Furthermore, it is a feature of the present device that the side edge portions of the scoop forming portion are tapered to a thin edge to facilitate use of the device for scraping various kitchen utensils, as is also the bifurcated end portion which is curved or rounded so as to readily adapt itself to the particular use of scooping batter from within the loops of a beater.

In accomplishing the above and other objects of the invention, I have provided the improved details of construction, the preferred forms of which are illustrated in the accompanying drawing, wherein—

Fig. 1 is a perspective view of the present device as applied in use to an egg beater member for cleaning material therefrom.

Fig. 2 is a side, or edge view of the device.

Fig. 3 is a top view of the same.

Fig. 4 is a cross section taken on the line 4—4 in Fig. 3.

Fig. 5 is a view illustrating the use of the device for scooping material from within the loops of an egg beater.

Fig. 6 is a view illustrating use of the device for cleaning the material from the curved surface of a kettle or pan.

Referring more in detail to the drawing—

Devices of the present character may vary somewhat in size and shape, but preferably for the intended uses would be approximately the size and shape of an ordinary table spoon and are formed with a straight and relatively rigid handle portion 1, terminating in a spoon or scoop shaped end portion 2. The handle portion 1, and scoop portion 2 may be integrally formed, or might be separately formed and then functionally joined together in any suitable manner. However, at present, it is preferred that they be molded or cast in one piece, of a suitable water resistant and yieldable material, such as rubber. Since it is desirable that the handle portion be relatively stiff or rigid, this might be made of hard rubber, or it might be equipped inside with a longitudinally extending rib, or bar of metal or other suitable material to give it the desired degree of rigidity. In Fig. 3, I have designated such a stiffening rib by reference numeral 3.

It is preferred that the scoop-shaped end portion 2 be rather flexible or yieldable so that it may be made to conform to the shapes of surfaces against which it may be pressed. This scoop end portion flares symmetrically outward from the point of connection with the handle, to a substantial width, as noted in Fig. 3, and then is rounded or tapered off across its end, as at 4, and is formed in its central, longitudinal line with a slit 5 extending from the rounded end 4 to a point approximately at the center of the scoop-like portion. The parts 6 and 6' located directly at opposite sides of the slit and adjacent its outer end, are rounded off to form a mouth 7 for the slit that facilitates the application of the device to a beater loop, as will presently be explained. Also, the inner end of the slit terminates in a rounded hole, as at 8, to provide for easier use.

In cross section, as best noted by reference to Fig. 4, the scoop shaped portion 2 of the device is substantially flat and along its side edges and across the curved end portion is tapered to a thin, scraping edge 9. Molded within this scoop end portion are two flexible wire, or metal ribs 10 and 10' which may, if desired, be a continuation of the stiffening rib 3 of the handle portion, or merely be embedded in the handle to extend into the bifurcated sections 6—6' as indicated in dotted lines in Fig. 3, thus to give the desired degree of flexibility as well as the upwardly curved shape to these parts, as will be noted in Fig. 2.

In using the present device for cleaning an egg beater, or the like, which comprises the coacting sets of wire, or metal strap loops, as designated at 12 in Figs. 1 and 5, the device is so applied to one of the loops that the latter will be received in the slit 5 of the scoop portion, as in Fig. 1. Then the device is drawn along the loop so that those portions 6—6' of the scoop portion at opposite sides of the slit will scrape the surfaces of the loop and the material that is scraped off will be caught in the scoop and temporarily retained. Then the device may be withdrawn from the loop and the material removed. After cleaning each of the wire loops of the beater in this manner, any material that may still remain within the loops may be scooped out by applying the device within the beater and rotating it, as illustrated in Fig. 5. It is to be particularly pointed out that the curved character of the scoop end is important since it permits the scoop to be inserted and turned over or rotated while within the loops without interference by any of the loops. This could not be accomplished if the scoop end were not curved. In this respect, the present device differs substantially from kitchen utensils that are designed merely for scraping a flat or curved surface.

It is to be explained also that the thin or tapered scraping edges 9 along the sides and ends of the scoop portion may be pressed tightly against a curved surface of a pan or bowl 13, as illustrated in Fig. 6, for the usual scraping or cleaning operation. The slit provided in the end of the scoop portion not only permits the device to be applied about the loop of an egg beater, as shown in Fig. 1, but it gives additional flexibility and provides two scraping surfaces when the device is used as in Fig. 6, for in this application of the device, the edge of the material adjacent the slit cooperates with the forward edge of the device for the cleaning of the surface.

Devices of this character, when made of rubber, or any equivalent material, may be easily and readily cleaned by washing in water and may be scalded and thus kept in a very sanitary condition, and this cleaning operation will not cause any deterioration in the character of the material. By selection of special material in the manufacture of such devices, it may be possible to eliminate the requirement for the internal stiffening members 3 and 10. It is desirable, however, in order to obtain the most utility from and to give greater serviceability to the device, that the handle be relatively stiff while the scoop portion, and particularly the parts adjacent the slit 5, be relatively flexible.

Having thus described my invention, what I claim as new therein and desire to secure by Letters Patent is:

1. A cleaning utensil of the character described having a relatively rigid handle portion, and a scraper mounted at one end thereof; said scraper comprising a relatively thin plate of resilient material extending from the handle and widened relative thereto, and formed with a slit extending into the body of the plate and with scraping edges defining the opposite sides of the slit, and said plate being curved to hook-like form to better retain material therein.

2. A cleaning utensil of the character described, comprising a substantially rigid handle member and a surface scraping scoop extending from one end of the handle, said scoop comprising a flattened body of resilient nature widened relative to the handle and having its outer end portion curved laterally from the plane of the flattened body and formed with a bifurcating slit from its outer end to the approximate center of the body.

3. A cleaning utensil of the character described, comprising a substantially rigid handle portion, and a scraping member extending from one end of the handle; said scraping member comprising a flat plate of resilient material extending from the handle at one end thereof and formed with peripheral scraping edges and symmetrically flared relative to the handle as it extends therefrom, and then rounded gradually to a tapered outer end portion, and formed with a slit extending substantially into the body from the tapered outer end for reception of a beater blade for the wiping of material from opposite sides of the blade.

JOSIE C. FINELY.